Figure 1:
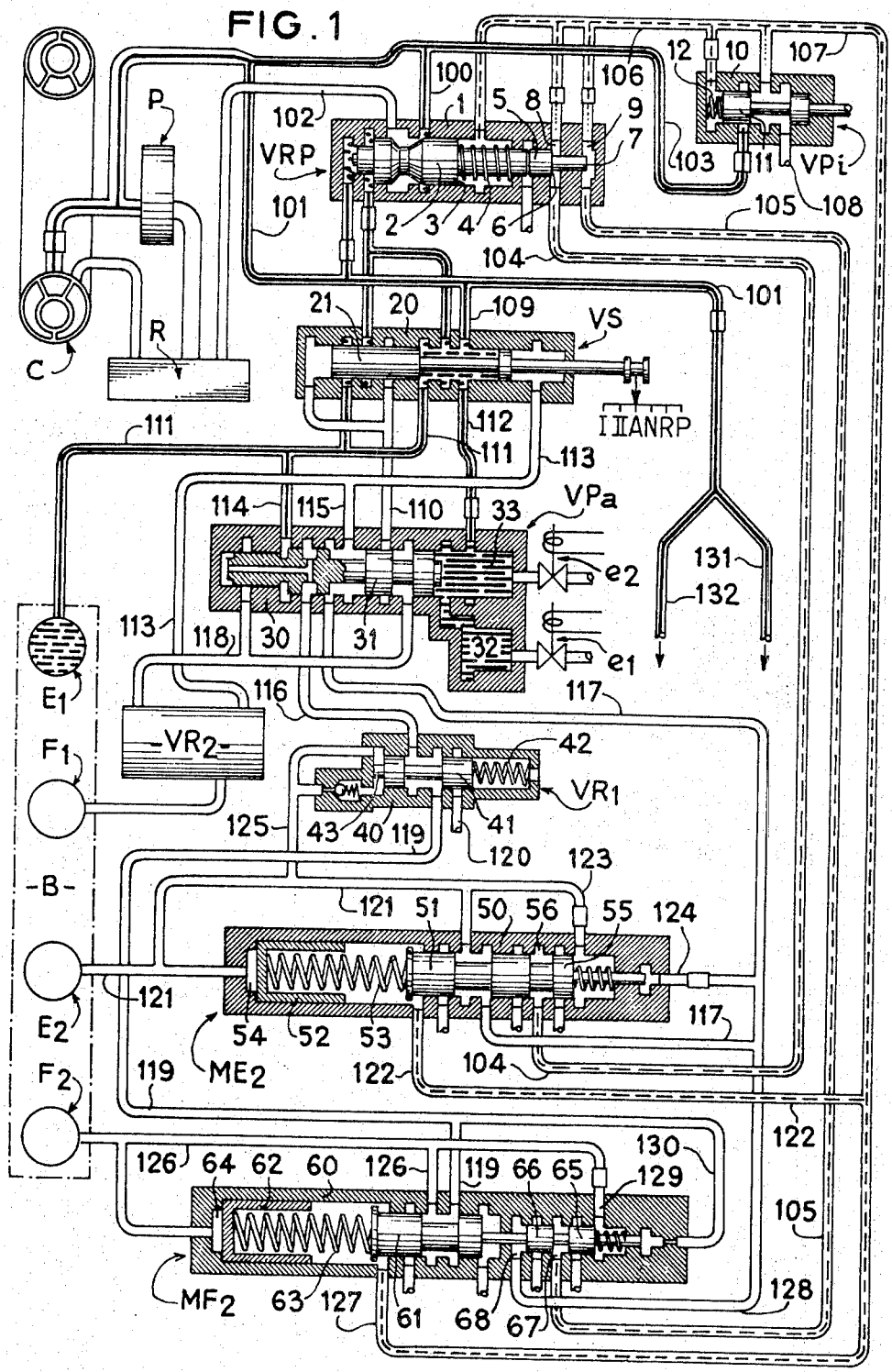

United States Patent [19]
Piret

[11] 3,822,611
[45] July 9, 1974

[54] CONTROL CIRCUIT FOR AN AUTOMATIC GEAR BOX
[75] Inventor: Jean Piret, Bougival, France
[73] Assignees: Automobile Peugeot, Paris; Regie Nationale des Usines Renault, Billancourt, both of, France
[22] Filed: June 27, 1972
[21] Appl. No.: 266,577

[30] Foreign Application Priority Data
July 21, 1971 France .............................. 71.26636

[52] U.S. Cl. .................................. 74/753, 74/869
[51] Int. Cl. ..... F16h 3/44, F16h 57/10, B60k 17/02
[58] Field of Search ............................. 74/753, 869

[56] References Cited
UNITED STATES PATENTS
3,675,512  7/1972  Hirozawa ............................ 74/869
3,688,608  9/1972  Leach ............................ 74/753 X

*Primary Examiner*—Samuel Scott
*Assistant Examiner*—P. S. Lall
*Attorney, Agent, or Firm*—Burns, Doane, Swecker & Mathis

[57] ABSTRACT

Hydraulic control circuit for a gearbox having planetary gear means and speed ratio selecting means which are associated with the planetary gear means and include clutch and brake devices the selective actuation of which determines the speed ratio. The control circuit includes means for modifying the value of the line pressure as a function of the speed engaged.

7 Claims, 4 Drawing Figures

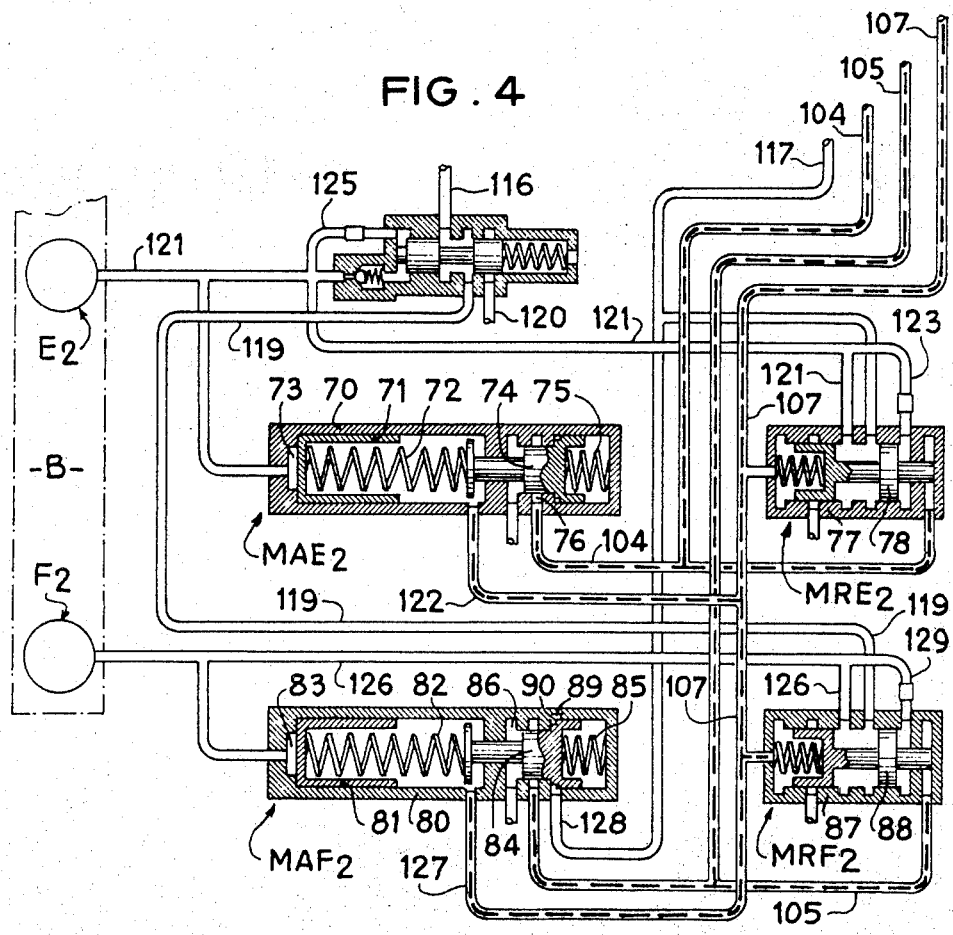

CONTROL CIRCUIT FOR AN AUTOMATIC GEAR BOX

The present invention relates to hydraulic control circuits for automatic gearboxes intended in particular for automobile vehicles.

It is known that these automatic gearboxes have at least one planetary gear set and afford between the input shaft and the output shaft a transmission ratio which depends on various parameters, such as the load on the engine and the speed of the vehicle. The suitable ratio is engaged by means of brakes and clutches the selective application of which is achieved by means of a hydraulic control circuit to which the present invention relates. Usually, in such circuits the pressure of the fluid fed to the various brakes and clutches, or line pressure, is controlled by a regulator, termed the pressure regulating valve, in accordance with the load and running speed of the engine. Now, owing to the reduced overall size of automatic gearboxes for placing them in vehicles of relatively small size and power, it has been necessary to decrease the dimensions of the clutches and brakes and therefore increase the line pressure in order to obtain sufficient actuating or application forces to transmit the nominal torque. The result of the increase in this pressure is an increased power consumption which could become an appreciable percentage of the power furnished by the engine, which is clearly a disadvantage in particular in the case of engines of relatively small capacity.

An object of the invention is therefore to provide a hydraulic circuit which, while it correctly controls the clutches and brakes of minimum sizes, does not decrease over much the available power of the associated engine. This is achieved by providing in this circuit means for modifying the value of the line pressure as a function of the gear or transmission ratio produced in the gearbox.

Indeed, the pressure for applying or actuating the brakes and clutches can be the smaller as the transmission ratio is nearer unity. In a gearbox having three forward speed ratios, the line pressure is regulated at a relatively high value for the first ratio, then at a lower value for the second ratio and a still lower value for the third ratio, it being possible to achieve a saving in power which is as much as several H.P.

According to a preferred embodiment of the invention, the circuit comprises a pressure regulating valve inserted in the delivery pipe of the hydraulic fluid supply pump in parallel with the main supply pipe, this valve having a sliding member subjected to a first regulating force due to a fluid pressure which represents the load of the engine, the position of the slide member determining the value of the line pressure, wherein said slide member is subjected to a second regulating force also due to a fluid pressure, whose value is a function of the speed ratio engaged.

Further features and advantages of the invention will be apparent from the ensuing description with reference to the accompanying drawings.

Figure 2:
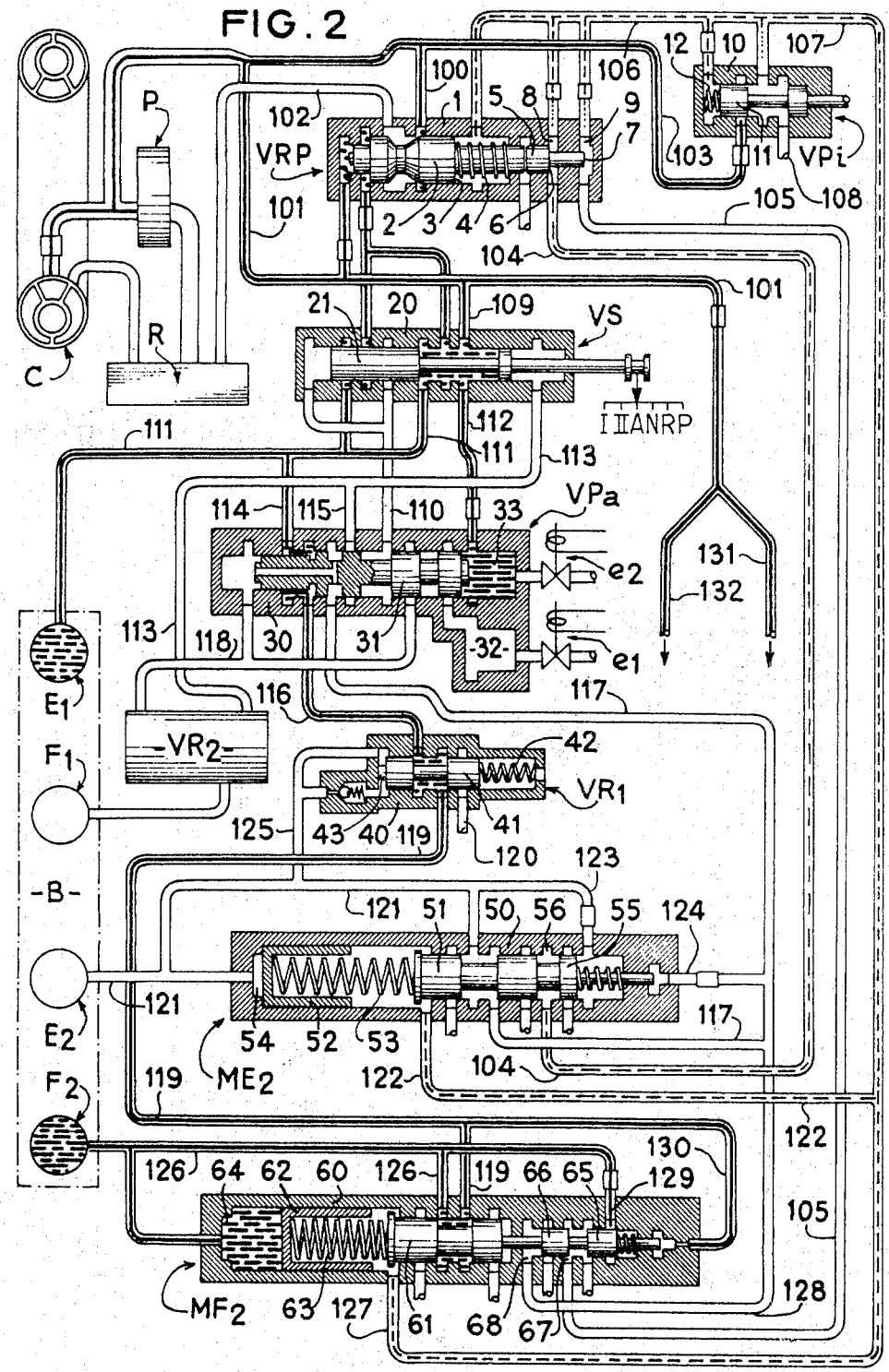
Figure 3:
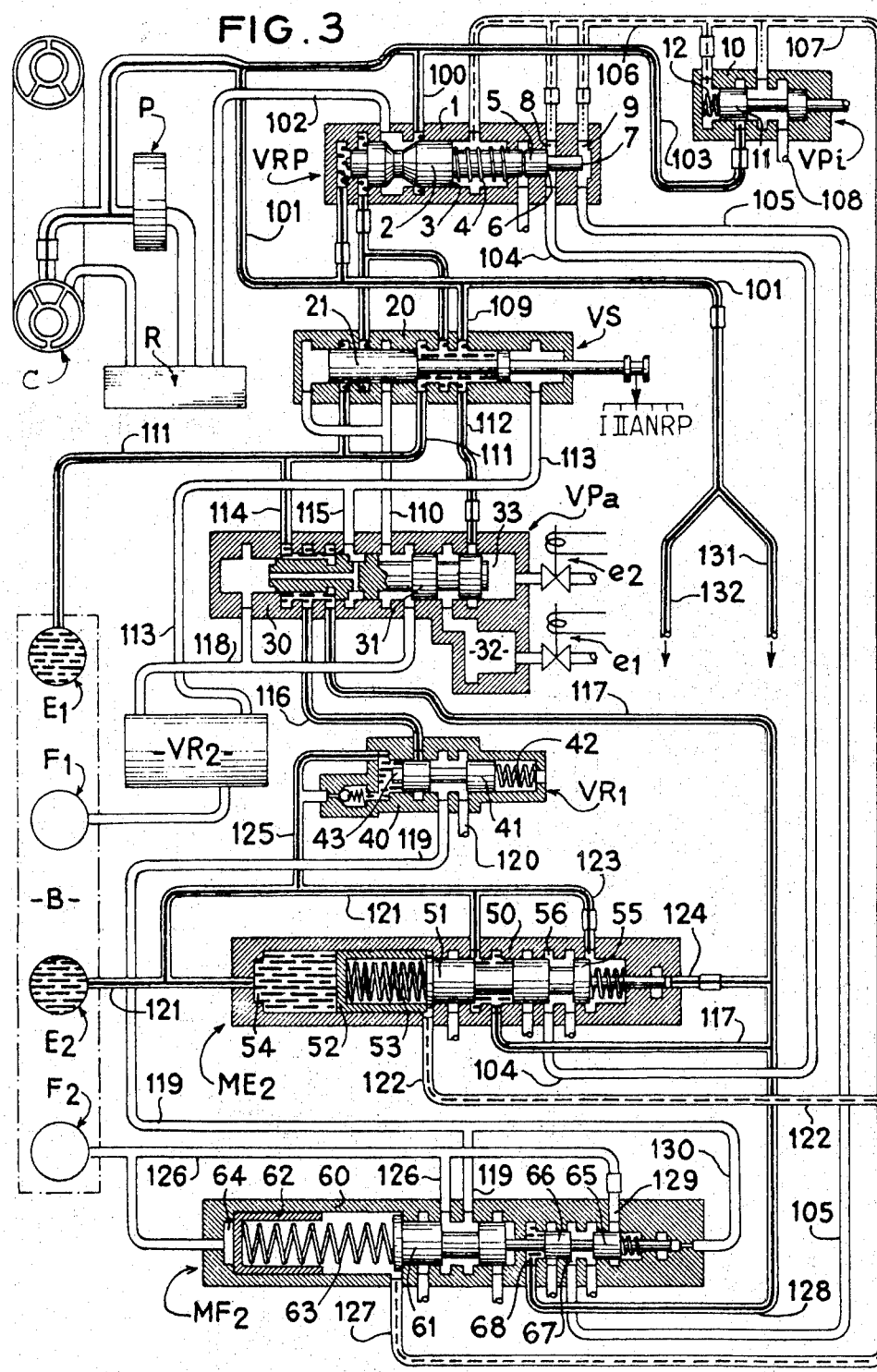

In the drawings:

FIGS. 1, 2 and 3 are three diagrammatic views of a hydraulic control circuit for an automatic gearbox according to the invention in three different states respectively, and FIG. 4 is a partial view of a modification of such a circuit.

Reference will first be made to FIG. 1 to describe the circuit according to the invention in its broad aspects, this circuit being intended to control an automatic gearbox B having three forward speeds and one reverse speed the engagement of which is achieved by a selective actuation or application of clutch and brake devices which are diagrammatically shown in the drawing and designated by the reference $E_1$, $E_2$, $F_1$, $F_2$.

Such a gearbox is disclosed, for example, in U.S. Pat. No. 3,741,038 and U.S. Pat. application Ser. No. 166,071 filed by the Applicants.

The main elements of the circuit are:

displacement pump P driven by the engine of the vehicle and supplying from a tank or reservoir R the whole of the circuit and in particular the torque converter C;

a pressure regulating valve VRP which determines the magnitude of the line pressure in the circuit:

a pilot valve VPi which is controlled in accordance with the load on the engine, for example as a function of the depression in the induction pipe and furnishes a pilot pressure acting on the slide member of the pressure regulating valve;

a manually-controlled selector valve VS whose slide member can be placed in any one of six positions which correspond respectively to the imposed first speed (I), to the imposed second speed (II), to the automatic forward speed operation (A), the neutral position (N), reverse speed (R) and parking (P);

a speed or gear change valve VPa whose slide member can occupy three positions depending on two parameters: the speed of the vehicle and the opening of the carburetter. These parameters are measured in the known manner by a tachometric alternator driven by the output shaft of the gearbox. The tachymetric alternator comprises a moving pole whose angular position corresponds to the angle of the throttle of the carburetter so that the output voltage of the alternator is a function of the speed of the vehicle and the driving torque. This voltage is treated by an electronic unit which acts on two electrically-operated pilot valves $e1$, and $e2$;

two relay valves: a main relay valve $VR_1$ and a secondary relay valve $VR_2$ whose purpose will be explained hereinafter as far as is necessary for an understanding of the invention;

two relatively complex units $ME_2$ and $MF_2$ the purpose of which is to fill rapidly the clutch $E_2$ or the associated brake $F_2$, to modulate the clutch-applying pressure $E_2$ and brake-applying pressure $F_2$ in accordance with the driving torque and also, according to the invention, to furnish information whereby it is possible to adapt the line pressure in accordance with the speed engaged.

In order to avoid unnecessarily complicating the present description, there will merely be described in more detail the parts of this circuit which have been modified and improved in accordance with the invention.

The regulating valve VRP comprises a body 1 in which is received a slide member 2, the axial position of the latter determining the value of the free section between a branch pipe 100 taken off from the delivery pipe 101 of the pump and an exhaust pipe 102 leading to the tank, the value of this free section determining the value of the line pressure in accordance with the output of the pump and the rate of flow employed. The slide member 2 is subjected at its left end, as viewed in FIG. 1, to the line pressure which constitutes the value or magnitude to be regulated and at its other end 3 to the pilot pressure delivered by the valve VPi. A relatively weak spring 4 biases the slide member toward the left as viewed in FIG. 1.

According to the invention, the slide member of the pressure regulating valve has a stepped extension portion 5 defining two radial faces 6,7 which are subjected to the pressure prevailing in two separate chambers 8, 9 formed in the body of the valve. These two chambers are connected to a branch pipe 106 of the pipe line in which the pilot pressure prevails. They are connected by two other pipes 104 and 105 to the units $ME_2$ and $MF_2$ in a manner which will be described hereinafter.

The pilot valve VPi comprising a body 10 and a slide member 11 is supplied with fluid by way of the pipe 103 in which prevails the line pressure and furnishes a pilot pressure which is transmitted by way of a pipe 106 to the pressure regulating valve and by way of a pipe 107 to the units $ME_2$ and $MF_2$. An exhaust pipe 108 is connected to the tank. The slide member 11 is subjected to the depression prevailing in the induction pipe of the engine (not shown) and, moreover, to the pilot pressure and to the force of a spring 12 which acts on the left end of the slide member as viewed in the drawing.

The selector valve VS comprises a body 20 and a slide member 21 whose position is chosen by the user of the vehicle. There is connected to this valve VS a supply pipe 109 connected to the pipe 202 in which flows the hydraulic fluid at line pressure. A number of pipes 110, 111, 112, 113 extend from the valve VS and are connected to the speed change valve VPa to the clutch $E_1$ and to the secondary relay valve $VR_2$.

The body 30 of the valve VPa receives a slide member 31 which is capable of occupying any one of three positions which are determined by the opening or closure of two electrically-operated pilot valves $e1$, $e2$. Inlet or supply pipes 110, 112, 114, 115 leading from the selector valve VS are connected to the speed change valve VPa. Outlet pipes 116, 117, 118, extend from the valve VPa and are respectively connected to the relay valve $VR_1$, to the clutch $E_2$ through the unit $ME_2$ and to the relay valve $VR_2$.

The valve VPa is controlled by the electrically-operated valves $e1$, $e2$ which control the connection to the exhaust of the chambers 32, 33 which are connected in parallel.

The main relay valve $VR_1$ comprises a fluid supply pipe 116 and two outlet pipes 119, 120 respectively leading to the unit $MF_2$ and to the tank and the position of its slide member 41 is controlled by the pressure prevailing in a pipe in accordance with the state of the clutch $E_2$. A spring 42 biases the slide member 41 toward the left as viewed in the drawing.

The unit $ME_2$ comprises a known part whose function is to modulate and regulate the pressure for applying the clutch $E_2$, this known part being disposed on the left as viewed in the drawing and comprising in a body 50: a slide member 51 having two bearing faces controlling the section of the passage between the pipe 117 leading from the valve VPa and an outlet pipe 121 supplying fluid to the clutch $E_2$. The body 50 also contains a hollow piston 52 biased by a spring 53 and subjected on one end to the pilot pressure furnished by way of a pipe 122 and on the other end to the pressure for applying the clutch $E_2$. The piston 52 defines with the body 50 a chamber 54 and constitutes with the spring 53 an accumulator. According to the invention, the slide member 51 is extended at its right end as viewed in the drawing by an additional bearing face 55 which determines the closure or the connection to the exhaust of the chamber 56 with which communicates the pipe 104 connected to the chamber 8 of the pressure regulating valve. The right end of this slide member is also subjected to the pressure for applying the clutch $E_2$ by way of the pipe 123 and to the line pressure by way of the pipe 124 (the last-mentioned connection is optional). A branch pipe 125 taken off the pipe 121 supplying fluid to the clutch $E_2$ also permits applying this clutch-applying pressure to the left end 43 of the piston 41 of the relay valve $VR_1$.

The unit $MF_2$ is constructed in substantially the same way as the unit $ME_2$, in particular as concerns its regulating and modulating functions. It has, as in the foregoing case, a body 60 and a slide member 61 whose position determines the value of the free section between the pipe 119 and the pipe 126 supplying the fluid to the brake $F_2$, and a hollow piston 62 biased by a spring 63 and subjected, on one end, to pilot pressure furnished by way of a pipe 127 and, on the other end, to the pressure for applying the brake $F_2$. The hollow piston 62 defines with the body 60 a chamber 64 and constitutes with the spring 63 an accumulator. The slide member 61 is extended at the right end as viewed in the drawing by two bearing faces 65 and 66 one of which performs exactly the same function as the bearing face 55 of the modulator $ME_2$ and determines the closure or the connection to the exhaust of a chamber 67 with which communicates the pipe 105 leading from the chamber 9 of the pressure regulating valve. This slide member comprises, with respect to the slide member 51 of the unit $ME_2$, an additional bearing face 66 which is subjected to the pressure prevailing in a chamber 68 with which communicates a pipe 128 which extends from the pipe 117 and whose function will be explained in the ensuing description of the operation of the circuit.

As in the case of the unit $ME_2$, the slide member 61 is also subjected at its right end to the pressure for applying the brake $F_2$ by way of a pipe 129 and to the line pressure by way of a pipe 130 (optional in the same way as the branch connection 124).

Connected to the pipe 101 are shown two pipes 131, 132 which diagrammatically represent gearbox lubricating circuits.

The operation of the control circuit according to the invention will be explained with reference to FIGS. 1, 2 and 3 which show the state of the circuit in automatic operation (position A of the selector valve VS) respectively for the first, second and third forward speeds.

In the diagrams shown in FIGS. 1, 2 and 3, a full line represents the pipes subjected to the line pressure and a dotted line represents those subjected to the pilot pressure. In these three Figures, the manually controlled selector valve is placed in the same position A corresponding to the automatic forward speed operation.

When the speed of the vehicle remains insufficient to produce the opening of the electrically-operated valve $e1$, the circuit is in the state shown in FIG. 1. Only the clutch $E_1$ is applied or operative and the two slide members 51, 61 of the units $ME_2$ and $MF_2$ are in such position that the chambers 56 and 67 are closed. The pilot pressure therefore prevails in the chambers 8 and 9 of the pressure regulating valve and this exerts a force on the slide member 2 and tends to shift it to the left as viewed in the drawing and tends to decrease the free section between the pipe 100 and the pipe 102. The line pressure is consequently established at maximum value, everything else being equal.

When a first speed threshold is reached, sufficient to produce the actuation and opening of the electrically-operated valve $e1$, the chamber 32 of the speed change valve is connected to the exhaust of the circuit so that the slide member of this valve is shifted and assumes the position shown in FIG. 2. In this new state, the clutch $E_1$ is still supplied with fluid, whereas the brake $F_2$ is applied, as can be seen in the drawing. The pressure which is then exerted on the hollow piston 62 of the unit $MF_2$ shifts this piston to the right and also shifts the slide member 61 to the right. This displacement of the slide member causes the chamber 67 to be connected to the exhaust of the circuit and consequently results in a pressure drop in the chamber 9 of the pressure regulating valve VRP. As the slide member 2 of this valve is under less pressure, it tends to move slightly to the right (which is not visible in the drawing) and this increases the section of the passage between the pipe 100 and the pipe 102 and consequently reduces the value of the line pressure.

With this speed of the vehicle increasing still further, when a second speed threshold is reached in respect of which the pilot valve $e2$ controlling the gear change valve is actuated, the chambers 32 and 33 of this valve are connected to the exhaust of the circuit so that the slide member 31 assumes the position shown in FIG. 3. Owing to the presence of the main relay valve $VR_1$, the brake $F_2$ remains applied so long as the clutch $E_2$ is not supplied with fluid. When this clutch is supplied with fluid by way of the path 114, $VPa$, 117, $ME_2$, 121, the pressure of the fluid supplied to this clutch, transmitted by way of the pipe 125, causes the slide member 41 of the relay valve to move to the right and interrupts the supply of fluid to the brake $F_2$. As before, this also shifts to the right, as viewed in the drawing, the hollow piston 52 and also shifts the slide member 51 of the unit $ME_2$. The chamber 56 is then connected to the exhaust of the circuit, namely to the tank, and this reduces the pressure in the chamber 8 of the pressure regulating valve. Moreover, it can be seen that, owing to the presence of the pipe 128 communicating with the chamber 68 and to the particular construction of the slide member of the unit $MF_2$, this slide member is maintained in the position in which the chamber 67 is connected to the exhaust so that the chamber 9 of the pressure regulating valve cannot be again subjected to pressure in the course of changing from second speed to third speed. The slide member of this pressure regulating valve is no longer subjected to pressure at its right end and the section of the passage between the pipe 100 and the pipe 102 tends to still further increase and this establishes the line pressure at a still lower value than in the case of the second speed. This is the purpose of the invention, namely to establish in the circuit a line pressure which is a function not only of the speed of and the load on the engine but also of the gear speed ratio engaged, it being understood that the line pressure has no need to be as high in respect of second and third speed as in respect of the first speed, which is the speed at which the torques transmitted are the highest.

It will be observed that in the course of changing from third to second speed under torque, produced by a drop in the speed and/or by the opening of the throttle which shifts the slide member 31 of the valve VPa to the left, the cutting off of the fluid under pressure supplied to the clutch $E_2$ and in the chamber 54 of the modulator $ME_2$ simultaneously produces the displacement to the left of the slide members 51, 61 of the modulators $ME_2$ and $MF_2$ and puts the two chambers 8 and 9 of the pressure regulating valve under pressure. Consequently, the passage under torque from the third to the second speed occurs with the maximum line pressure or the pressure pertaining to the first speed so that the brake $F_2$ can be filled very rapidly.

By way of example, it may be noted that a gearbox which requires a pressure of 11 bars for first speed may perfectly well operate with a pressure of 5 bars for second speed and 3 bars for third speed. If it is assumed that the rate of supply the fluid is of the order of 45 litres per minute and, bearing in mind the efficiency, the power consumed by the pump at 11 bars is of the order of 3HP whereas for a pressure of 3 bars it is only of the order of 0.8 HP. Thus it can be seen that such a stepping down or up of the pressure as a function of the speed engaged results in an appreciable saving in power in third speed, which is important when such an automatic gearbox is associated with a relatively low-power engine.

Whereas in the embodiment shown in FIGS. 1 to 3, the means for changing the value of the line pressure in accordance with the gear ratio engaged are incorporated in the regulating and modulating devices, in the embodiment shown in FIG. 4, these units are constructed in two parts whose overall function is identical but whose division facilitates the manufacture and the positioning in the vehicle. In FIG. 4, the same reference numerals designate the elements or pipes already shown in FIGS. 1–3.

The assembly associated with the clutch $E_2$ is then constituted by an acumulator modulator $MAE_2$ which comprises, as before, a body 70, a hollow piston 71 biased by a spring 72 and the pilot pressure furnished by the pipe 122. This piston defines with the body a chamber 73 connected to the supply pipe 121 of the clutch $E_2$. The spring 72 bears against a slide member 74 which is also biased by a spring 75 and determines the closure or the connection to the exhaust of a chamber 76 with which the pipe 104 communicates, this pipe being connected to the chamber 8 of the pressure regulating valve. The second part of the assembly is constituted by a regulator $MRE_2$ comprising a body 77 and a slide member 78 to which is supplied the line pressure by way of the pipe 117, the outlet being constituted by the pipe 121 leading to the clutch $E_2$. In order to regulate the pressure which prevails in the supply pipe 121 of the clutch $E_2$, the reference value of the regulator $MRE_2$ has, during the changing of the speeds under torque, a value which is a function of the pilot pressure supplied by way of the pipes 107 and 104. This pressure acts on the ends (of different sections) of the slide member 78 in opposition to the regulating pressure applied by way of the pipe 123.

As soon as the end of the transitory speed (gear change under torque) is reached, the pilot pressure of the pipe 104 is connected to the exhaust of the circuit by the action, at the end of its travel, of the piston 71 on the slide member 74.

The reference value of $MRE_2$ is then higher and this brings the pressure level for clutch $E_2$ to a value which is hardly different from the line pressure.

The assembly associated with the brake is constructed in the same manner so that its various parts carry reference numerals 80–88 corresponding to reference numerals 70–78 mentioned hereinbefore, except that an additional pipe 128 is provided connecting the pipe 117 to a chamber 89 formed in the body 80 and partly defined by a shoulder 90 on the slide member 84. The pressure supplied to the chamber 89 by way of the pipe 128 maintains the slide member 84 towards the right, as viewed in the drawing, when the speed ratio changes from the second to the third speed and thus still connects the chamber 86 to the exhaust notwithstanding the fact that the piston 81 no longer acts at the end of the slide member 84. During this sequence, the piston 81, which is biased by the pressure of the fluid of the brake $F_2$ in second speed, returns to the initial position in third speed by the cutting off of the pressure of the fluid of the brake $F_2$, the putting under pressure of the chamber 89 as soon as the change to third speed starts, that is, before the brake $F_2$ is released, constituting a memory which, in third speed, maintains the slide member 84 toward the right (as viewed in the drawing) so as avoid putting the chamber 9 of the regulating valve VRP under pressure.

This device has the further advantage of very rapidly filling the brake $F_2$ at the start of the change from the first to the second speed. The filling of the brake $F_2$ is encouraged by the pressure rises in the line during the transitory speed of the change from the third speed to the second speed to a level which corresponds to the first speed pressure. At the start of the transitory speed of the change from the third speed to the second speed, the fluid supply to the clutch $E_2$ is cut off, the memory of the slide member 84 is eliminated by the connection to the exhaust of the pipe 128 which closes the pipe 105. The connection to the exhaust of the clutch $E_2$ releases the slide member 74 by the rearward movement of the piston 71 which results in the closure of the pipe 104. The pipes 104 and 105 being closed, the line pressure rises to the level of the first speed pressure.

When the input shaft of the gearbox reaches the speed of synchronism, brake $F_2$ is applied and the piston 81 approaches the end of the slide member 84 so that, but a little time after the end of the transitory speed, the slide member 84 connects the pipe 105 to the exhaust. The pipe 105 has no pressure and the pipe 104 is under pressure and the chamber 8 is put under pressure and the chamber of the valve VRP is cut off from pressure, which gives a pressure regulation which corresponds to the second speed or gear ratio.

The operation of the device in this structure is exactly that of the embodiment described hereinbefore with respect to FIGS. 1 to 3.

Further, although this description refers to the case of a gearbox having three gear ratios, it must be understood that the invention may be applied to the case of a gearbox having a different number of ratios. Further, equivalent results may be obtained by reversing the direction of the action exerted on the slide member 2 of the pressure regulating valve, the necessary modifications being obvious to one skilled in the art.

Having now described my invention what I claim as new and desire to secure by Letters Patent is:

1. A hydraulic control circuit for a gearbox for an engine output shaft, the gearbox having planetary gear means and fluid pressure actuated devices combined with the gear means for engaging different speed ratios upon selective supply of fluid pressure to and actuation of said devices, said circuit comprising a fluid tank; a pump having an inlet communicating with fluid in said tank and a delivery pipe; a fluid pressure conducting line connected to said delivery pipe; a fluid pressure regulating valve connected to said line for regulating the line pressure, the fluid pressure regulating valve having a body, a first slide member having a first face exposed to said line pressure and a second face opposed to the first face, a first chamber defined between said body and said second face of the slide member, the first slide member being slidable in the body in a first direction to reduce said line pressure and in a second direction to increase said line pressure; a pilot valve for combination with means responsive to the torque of the engine for supplying a pilot fluid pressure which varies with the torque of the engine; means putting said first chamber in communication with said pilot pressure; a speed ratio changing valve connected to said line for putting said line in communication with selected ones of said devices through fluid pressure supply means leading to said devices; a fluid pressure modulator unit combined with the fluid pressure supply means of one of said devices and comprising a second body defining a fluid accumulator chamber connected to the fluid pressure supply means of said one device, a piston slidable in the second body and defining one end of said fluid accumulator chamber, a second slide member slidable in the second body, a spring interposed between the piston and the second slide member, a second chamber in the second body and having an outlet communicating with the tank, the second slide member normally closing said outlet but being capable of opening said outlet when shifted in a direction in which it is shifted when the piston is exposed to the line pressure in the fluid pressure supply means of said one device, a conduit putting the second chamber in communication with the first chamber, whereby when said one device is supplied with the line pressure by way of its fluid pressure supply means, the line pressure shifts said second slide member through the agency of the piston and the spring and opens said outlet and puts the first chamber in communication with the tank and causes the first slide member to shift in said first direction and reduce the line pressure.

2. A hydraulic control circuit as claimed in claim 1, further comprising a second fluid pressure modulator unit combined with the fluid pressure supply means of another of said devices, the second fluid pressure modulator unit being substantially identical to the first fluid pressure modulator unit in construction and operation and comprising a third body, a second fluid accumulator chamber, a second piston, a third slide member, a second spring, a third chamber and a second outlet which correspond to the second body, said accumulator chamber, said piston, the second chamber and said outlet respectively of the first-mentioned fluid pressure modulator unit, the third slide member normally closing the second outlet leading to the tank but being capable of opening the second outlet when shifted when the second piston is exposed to the line pressure in the fluid pressure supply means of said other device, the fluid pressure regulating valve body defining a fourth chamber, and a third face opposed to said first face being provided on the first slide valve and defining a part of the fourth chamber, means putting the fourth chamber in communication with the pilot pressure and means putting the fourth chamber in communication with the third chamber, whereby when the third slide member is shifted by the line pressure through the agency of the second piston and second spring when actuating said other device the fourth chamber is connected to the tank and the first slide member moves in said first direction and reduces the line pressure, actuation of said one device being for engaging the second speed ratio of the gearbox and the release of said one device and the actuation of said other device being for engaging the third speed ratio of the gearbox, means being provided for exposing said second slide member to said line pressure for maintaining the second slide member in a position to maintain said first-mentioned outlet open when changing from the second speed ratio to the third speed ratio.

3. A control circuit as claimed in claim 2, wherein said second slide member is exposed to the line pressure when the third speed is engaged by actuation of said other device.

4. A control circuit as claimed in claim 2, for a gearbox having three forward speeds, wherein the change from the third to the second speed ratio is effected by release of said other device, the line pressure determined by the pressure regulating valve during the transitory stage of changing under torque from the third to the second speed ratio being the same as that which is delivered when the first speed ratio is engaged.

5. A control circuit as claimed in claim 2, wherein each modulator unit constitutes an independent unit.

6. A control circuit as claimed in claim 2, wherein each modulator unit is constructed in two parts and comprises a first part constituting a modulator and accumulator in which are incorporated the corresponding outlet and slide member for opening and closing the outlet, and a second part constituting a regulator for regulating the pressure of the fluid supplied to the corresponding device.

7. A hydraulic control circuit for a gearbox for an output shaft of an engine, the gearbox having planetary gear means and fluid pressure actuated devices combined with the gear means for engaging different speed ratios upon selective supply of fluid to and actuation of said devices, said circuit comprising a fluid tank, a pump for drawing fluid from the tank and delivering the fluid at a pressure, a speed ratio changing valve, a fluid conveying line for connecting the pump to the speed ratio changing valve and supplying the pressurized fluid from the pump to the speed ratio changing valve, a pressure regulating valve connected to said line for regulating the line fluid pressure, a pilot valve for supplying a fluid at a pilot pressure, fluid supply systems respectively connecting the speed ratio changing valve to said devices, the speed ratio changing valve being for combination with means responsive to parameters of operation of the engine and gearbox for selectively putting said fluid supply systems in communication with said line in accordance with said parameters for selective actuation of said devices, the pressure regulating valve comprising a body, a slide member slidable in the body in a first direction to decrease said line pressure and in a second direction to increase said line pressure, first chamber means for subjecting one end portion of the slide member to said line pressure and second chamber means for subjecting an end portion of the slide member opposed to said one end portion to said pilot fluid pressure, a first of said supply systems pertaining to a first of said devices comprising means for modifying the force exerted on said second end portion of the slide member by said pilot fluid pressure in said second chamber means when said first supply system receives said line pressure from said speed ratio changing valve for actuating said first device, a second of said supply systems pertaining to a second of said devices comprising means for modifying the force exerted on said second end portion of the slide member by said pilot fluid pressure in said second chamber means when said second supply system receives said line pressure from said speed ratio changing valve for actuating said second device, whereby the position of the slide member in said body is directly affected by actuation of said first device and second device and modifies the line pressure in accordance with the change in speed ratio effected by said first and second devices.

* * * * *